(12) United States Patent
Kodeswaran et al.

(10) Patent No.: US 10,378,936 B2
(45) Date of Patent: Aug. 13, 2019

(54) IDENTIFICATION OF FAILED SENSORS IN A SYSTEM OF INTERCONNECTED DEVICES

(71) Applicant: International Business Machines Corporation, Armonk, NY (US)

(72) Inventors: Palanivel A. Kodeswaran, Bangalore (IN); Ravindranath Kokku, Hyderabad (IN); Sayandeep Sen, Bangalore (IN); Mudhakar Srivatsa, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 376 days.

(21) Appl. No.: 14/846,276

(22) Filed: Sep. 4, 2015

(65) Prior Publication Data

US 2017/0067763 A1  Mar. 9, 2017

(51) Int. Cl.
*G01D 18/00* (2006.01)
*G06N 7/00* (2006.01)

(52) U.S. Cl.
CPC ............. *G01D 18/00* (2013.01); *G06N 7/005* (2013.01)

(58) Field of Classification Search
None
See application file for complete search history.

(56) References Cited

U.S. PATENT DOCUMENTS 4,788,398 A   11/1988   Hornung 5,680,409 A * 10/1997   Qin ......................... G05B 9/02
                                                702/116

(Continued)

FOREIGN PATENT DOCUMENTS

CN   102223252 A   10/2011
CN   203520106 U    4/2014

OTHER PUBLICATIONS

Kapitanova, Krasimira, et al., "Repair Assessment of Sensor Node Failures for Activity Detection", The Second International Workshop on Networks of Cooperating Objects (CONET 2011), Apr. 11, 2011, Chicago, IL, USA, 6 pages, vol. 11, University of Virginia Library.

(Continued)

*Primary Examiner* — Khaja Ahmad
(74) *Attorney, Agent, or Firm* — Ference & Associates LLC

(57) ABSTRACT

Methods and arrangements for identifying failed sensors in a system of interconnected devices. A contemplated method includes: utilizing at least one processor to execute computer code that performs the steps of: receiving data from a first plurality of sensors, each sensor being operatively coupled to a device within a system of interconnected devices; associating the data received with an activity; comparing the data received with previously stored data associated with the activity; detecting, based on the comparing, an anomaly associated with at least one of the first plurality of sensors, wherein the anomaly indicates a problem with the at least one of the first plurality of sensors; and recording, at a data storage location, the anomaly, wherein the data storage location stores data associated with previously identified anomalies. Other variants and embodiments are broadly contemplated herein.

10 Claims, 3 Drawing Sheets

(56) References Cited

U.S. PATENT DOCUMENTS

| | | | |
|---|---|---|---|
| 8,620,841 B1 | 12/2013 | Filson et al. | |
| 2004/0075549 A1* | 4/2004 | Haller | G06K 17/0022 340/522 |
| 2005/0251364 A1* | 11/2005 | Kang | G05B 9/02 702/183 |
| 2006/0291657 A1* | 12/2006 | Benson | G05B 13/0275 380/270 |
| 2008/0181280 A1* | 7/2008 | Wang | G01K 15/00 374/1 |
| 2009/0276184 A1* | 11/2009 | Mylaraswamy | G01D 18/00 702/185 |
| 2011/0007139 A1* | 1/2011 | Brunetti | G08B 13/19613 348/51 |
| 2012/0215450 A1* | 8/2012 | Ashok | G05B 23/0254 702/9 |
| 2013/0099922 A1* | 4/2013 | Lohbihler | G08B 13/184 340/539.17 |
| 2013/0283104 A1 | 10/2013 | Hosking et al. | |
| 2014/0286372 A1* | 9/2014 | Kobayashi | G01K 15/007 374/1 |
| 2015/0073750 A1* | 3/2015 | Birru | H05B 37/0254 702/183 |
| 2015/0257203 A1* | 9/2015 | Okada | G08C 15/00 370/338 |
| 2018/0231394 A1* | 8/2018 | Goh | G01D 3/08 |

OTHER PUBLICATIONS

Jakkula, Vikramaditya, et al., "Detecting Anomalous Sensor Events in Smart Home Data for Enhancing the Living Experience", Association for the Advancement of Artificial Intelligence, AAAI Workshop, Artificial Intelligence and Smarter Living—The Conquest of Complexity, 2011, 5 pages, Association for the Advancement of Artificial Intelligence, Palo Alto, CA, USA.

Munir, Sirajum, et al., "FailureSense: Detecting Sensor Failure using Electrical Appliances in the Home", 11th International Conference on Mobile Ad Hoc and Sensor Systems, 2014, 9 pages, IEEE Computer Society, IEEE Digital Library.

* cited by examiner

IDENTIFICATION OF FAILED SENSORS IN A SYSTEM OF INTERCONNECTED DEVICES

BACKGROUND

The Internet of Things (IoT) has significant practical implications in many everyday settings. Consumers can benefit from devices (e.g., home-based appliances such as refrigerators, air conditioners, televisions, lights, lamps, etc.) that may have actuation, communication, and sensing capabilities to reach or identify a desired state. The devices may allow another user, from a remote location, to identify if a device is being used.

With the devices and sensors connected to the devices being interconnected, a remote user may be able to identify an activity being performed by a user living within the home (e.g., cooking, moving, sleeping, etc.). This activity identification may then allow the remote user to determine if the person living within the home is behaving normally and as expected. Upon notification that the user is not performing particular activities, the remote user can then determine whether a person should be dispatched to check on the person living within the home. In order to ensure accurate identification of a problem, the system must identify that the sensors are behaving correctly and providing accurate data.

BRIEF SUMMARY

In summary, one aspect of the invention provides a method of identifying failed sensors in a system of interconnected devices, said method comprising: utilizing at least one processor to execute computer code that performs the steps of: receiving data from a first plurality of sensors, each sensor being operatively coupled to a device within a system of interconnected devices; associating the data received with an activity; comparing the data received with previously stored data associated with the activity; detecting, based on the comparing, an anomaly associated with at least one of the first plurality of sensors, wherein the anomaly indicates a problem with the at least one of the first plurality of sensors; and recording, at a data storage location, the anomaly, wherein the data storage location stores data associated with previously identified anomalies.

Another aspect of the invention provides an apparatus for identifying failed sensors in a system of interconnected devices, said apparatus comprising: at least one processor; and a computer readable storage medium having computer readable program code embodied therewith and executable by the at least one processor, the computer readable program code comprising: computer readable program code that receives data from a first plurality of sensors, each sensor being operatively coupled to a device within a system of interconnected devices; computer readable program code that associates the data received with an activity; computer readable program code that compares the data received with previously stored data associated with the activity; computer readable program code that detects, based on the comparing, an anomaly associated with at least one of the first plurality of sensors, wherein the anomaly indicates a problem with the at least one of the first plurality of sensors; and computer readable program code that records, at a data storage location, the anomaly, wherein the data storage location stores data associated with previously identified anomalies.

An additional aspect of the invention provides a computer program product for identifying failed sensors in a system of interconnected devices, comprising: a computer readable storage medium having computer readable program code embodied therewith, the computer readable program code comprising: computer readable program code that receives data from a first plurality of sensors, each sensor being operatively coupled to a device within a system of interconnected devices; computer readable program code that associates the data received with an activity; computer readable program code that compares the data received with previously stored data associated with the activity; computer readable program code that detects, based on the comparing, an anomaly associated with at least one of the first plurality of sensors, wherein the anomaly indicates a problem with the at least one of the first plurality of sensors; and computer readable program code that records, at a data storage location, the anomaly, wherein the data storage location stores data associated with previously identified anomalies.

A further aspect of the invention provides a method of identifying failed sensors in a system of interconnected devices, said method comprising: utilizing at least one processor to execute computer code that performs the steps of: receiving data from a first plurality of sensors, each sensor being operatively coupled to a device within a system of interconnected devices; associating the data received with an activity; comparing the data received with previously stored data associated with the activity; receiving additional data from a second plurality of sensors, wherein at least one sensor is common between the first plurality of sensors and the second plurality of sensors; associating the additional data received with a second activity; comparing the additional data received with previously stored data associated with the second activity; detecting, based on the comparing, an anomaly associated with the at least one sensor which is common between the first plurality of sensors and the second plurality of sensors, wherein the anomaly indicates a problem with the at least one sensor which is common; recording, at a data storage location, the anomaly, wherein the data storage location stores data associated with identified anomalies; and identifying at least one failed sensor within the first plurality of sensors, wherein the at least one failed sensor is identified as the at least one of the first plurality of sensors for which the anomaly was detected; the identifying comprising calculating an improbability associated with the at least one of the first plurality of sensors, wherein the improbability identifies a likelihood of sensor failure and wherein the identifying further comprises identifying that the improbability exceeds a predetermined threshold.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
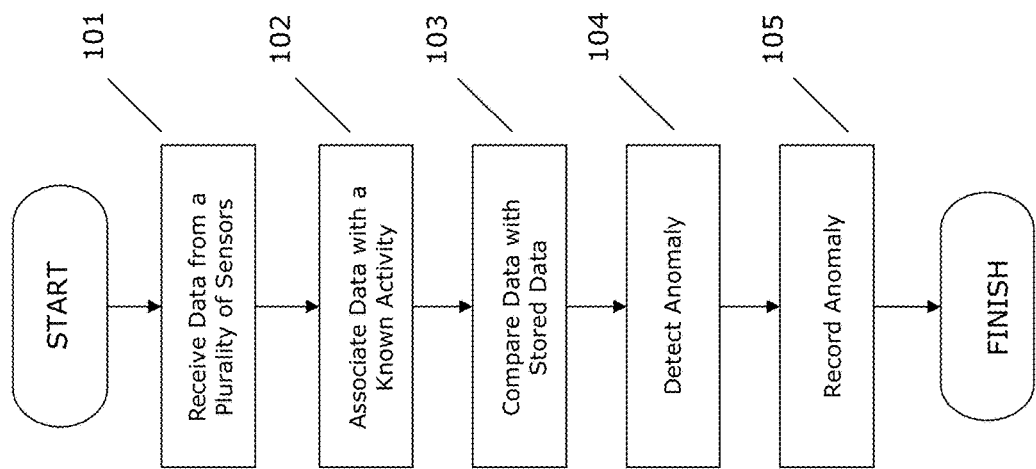
FIG. 1 schematically illustrates a system architecture for identification of failed sensors in a system of interconnected devices.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will now be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, most if not all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

Users may be living in a home, but may need assistance due to health concerns. However, they do not need or wish for someone to assist them in a continuous manner, but would rather prefer that someone can make sure that they are performing activities associated with daily living (e.g., bathing, cooking, sleeping, moving, etc.). To assist in allowing the user to remain at home or in a home-like living situation without the need for someone in a continuous manner, the user may implement a remote monitoring system. In such a system, devices within the home (e.g., bed, hallways, stove, refrigerator, sink, lights, doors, etc.) may be equipped with sensors. These sensors may allow a remote monitoring of the home to ensure that the user is performing tasks and still functioning without assistance. Such a system may be identified as an Internet of Things (IoT) system, which may be broadly defined as a system of interconnected devices. The interconnected devices may then communicate with each other or a central system, as described in more detail below.

One problem with such a system is that sensors may fail, which may indicate a problem with the user when a problem does not actually exist. One way they may fail is a complete failure, which may include the sensor no longer functioning in any form. Such a failure may be identified by lack of communication with a central system. Another failure may be just a failure of communication, which can be identified in the same manner. However, a third type of failure may include the sensor no longer detecting events or providing spurious event detections. This type of failure may not be detected by the lack of communication because the sensor may still be communicating with the system but not sending the correct signals.

One technique for detecting a failure of a sensor is to use the history of the sensor to identify if the sensor is behaving as the sensor has previously behaved. A problem with this method for detecting failed sensors is that such detection relies on the history of a single sensor to identify if that sensor has failed. The system may monitor a single sensor and identify if a reading from the sensor appears to be out of the normal for that sensor based on the history of the sensor. The issue with this is the false positives are very common and then require someone to manually check the sensor.

Another method for detecting failed sensors relies on a group of sensors all having the same reading. As an example, for a system in which the user wants accurate data, the user may attach multiple sensors to the device to all read the same reading, for example, temperature. Alternatively, sensors may be located in a small geographical area around the device. All sensors will read the temperature associated with the device and/or location and relay those readings to a processing unit. If the processing unit determines that one of the multiple sensors has a reading inconsistent with the other sensors, the sensor may be identified as failed. The drawback to this approach is that it becomes costly to include multiple redundant sensors on a single device, especially if the necessity of the information is not critical. Also, if there are many devices, having redundant sensors on all the devices may not only be expensive, but may also not be feasible due to space constraints. An additional problem with this approach is that the sensor identified as failed may not have actually failed, rather, because the system forecasts failures of sensors based on readings from the other sensors within close range, false positives are common using this approach.

Accordingly, broadly contemplated herein are systems and arrangements for detecting anomalies associated with a sensor in a system of interconnected devices. These anomalies may then be used to identify a failed sensor within the system of interconnected devices. The anomalies may be detected by comparing received data from a plurality of sensors to previously stored or historical data associated with the same sensors. For example, in one embodiment the data received from the sensors may be associated with an activity, which may be an activity of daily living, (e.g., bathing, moving, cooking, drinking, sleeping, etc.). An embodiment may then compare the received data with previously stored data associated with the identified activity. Based upon the data received and the data expected, as contained within the previously stored data, an embodiment may then identify and record an anomaly associated with the data. If the detected anomalies reach a certain threshold, an embodiment may identify that the sensor associated with the anomaly is behaving incorrectly or has failed, which may then be relayed to a user.

Figure 2:
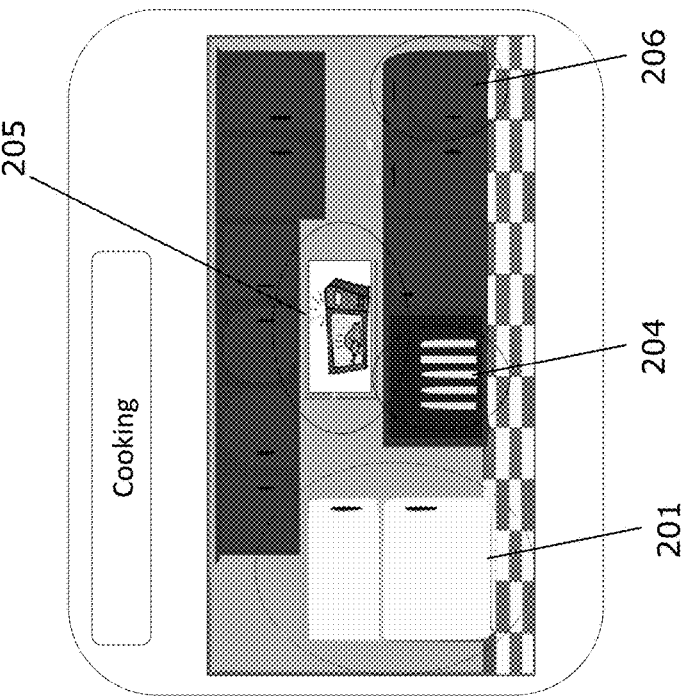
FIG. 2 depicts a plurality of sensors in a system of interconnected devices.
Figure 2:
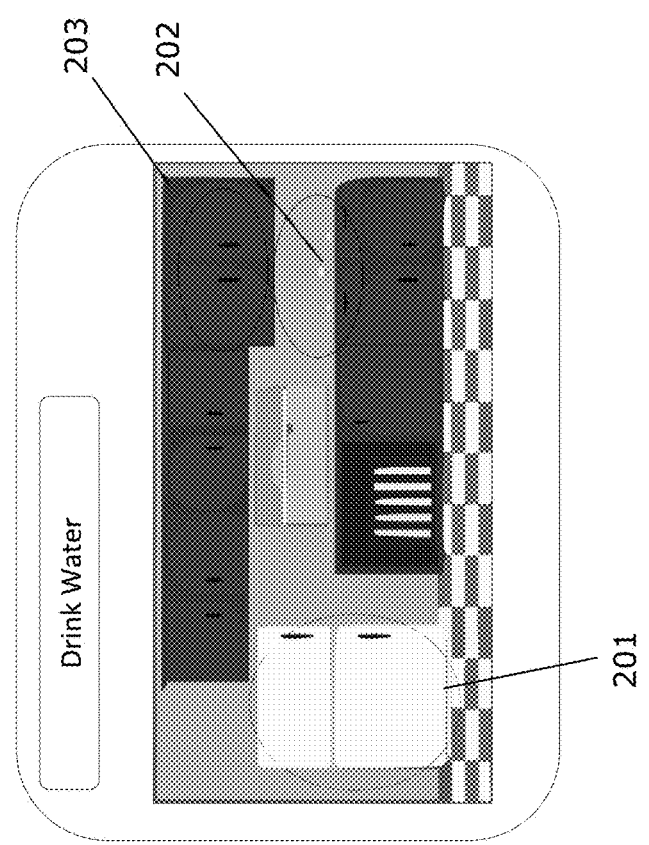

FIG. 1 schematically illustrates a system architecture, in accordance with at least one embodiment of the invention. At 101, an embodiment may receive data from a plurality of sensors in a system of interconnected devices. These devices may be contained within an Internet of Things (IoT) setting. An IoT setting may generally be a system of interconnected devices that either communicate with each other or communicate with a central system which can process the data received from the devices within the setting. As an example, an IoT setting may be a home in which devices within the home have sensors attached to or communicating with the device. Devices may include stoves, refrigerators, doors, beds, air conditioners, windows, lights, and the like. Such an IoT setting may be used to monitor individuals living in a home but who may need some assistance or oversight. For example, such an individual may have health issues (e.g., dementia, post operative, etc.), may be a minor, may be elderly, may just need someone to verify that they are active, and the like.

The sensors of the devices may be used to detect if the device is being actuated (e.g., opened/closed, turned on/off, if pressure is received, etc.). For example, a sensor on a door may detect whether the door is opened or closed. As another example, a sensor on a bed may detect whether a person is lying in the bed or not. In other words, the sensors can be state sensors, pressure sensors, mechanical sensors, motion sensors, or a variety of other sensors used to detect a state of a device or person. The sensors may communicate with each other, for example, the sensors may send signals to other sensors within the home. Alternatively, the sensors may communicate with a central system which may be local (e.g., in the home) or remote (e.g., at a central processing location). As another alternative, the sensors may communicate with a system located locally and the local system may then convey or send the information for processing to a remote location. In other words, the gathering and processing of the data received from the sensors may be in a local, remote, or combination of locations.

Once the data have been received, an embodiment may (at 102) associate the data with a known activity. An embodiment may accomplish this by comparing the received data with known sensor event patterns and/or rules associated with known activities. As a very simple example, used for the purposes of explanation and referring now to FIG. 2, sensors may be located on the refrigerator 201, sink 202, cabinet door 203, oven 204, microwave 205, and garbage receptacle door 206. The system may have learned common behaviors of the sensors to identify an activity. For example, the system may have learned that signals received from the sensors on the refrigerator 201, sink 202, and cabinet door 203, may be associated with the activity of drinking water. The system may also have learned that signals received from the refrigerator 201, oven 204, microwave 205, and garbage receptacle door 206, may be associated with the activity of cooking.

In identifying an activity, the system may not only base the identification on which sensors are actuated, but also on the timing of the sensor actuation. In other words, the system may learn that generally when the user is drinking water the signal from the cabinet door 203 is received before the signal from the refrigerator 201. Additionally, the system may learn that the signal from the cabinet door 203 is received at a particular time frame before the signal from the refrigerator 201, for example, thirty seconds to two minutes apart. This can also be expanded to the sensor for the sink 202. The system may also learn that a different pattern of sensor signals may also indicate the same activity. For example, the person who gets a drink of water may first open the cabinet door 203 and then turn on the sink 202 before opening the refrigerator 201. In other words, the system may learn rules and/or patterns for sensor events and then map these events to activities which may be associated with a particular individual. By knowing the rules and/or patterns for sensor events, an embodiment may take the data received at 101 and associate them with an activity at 102 which has previously been mapped within the system.

At 103, an embodiment may compare the data received with previously stored data associated with the known activity. In other words, the system has identified an activity which the user may be performing based upon the sensor events and patterns. The system now compares the received data with the previously stored data associated with the identified/assumed activity. For example, if the identified/assumed activity is cooking, the system knows that the activity of cooking is associated with sensors of the refrigerator 201, oven 204, microwave 205, and garbage receptacle door 206. The system then identifies if sensor signals were received from each of these devices and in a pattern (e.g., timing, sequence, etc.) associated with the activity.

After the comparison at 103, an embodiment may detect an anomaly within the received data at 104. The anomaly may be associated with one or more of the sensors within the plurality of sensors and may indicate a problem with the one or more sensors that the anomaly is associated with. In one embodiment the anomaly may comprise receiving no signal from a sensor when a signal is expected based upon the previously stored data associated with the known activity. For example, if the activity that has been identified at 102 is cooking, the system may expect signals from the refrigerator 201, oven 204, microwave 205, and garbage receptacle door 206. However, if a signal is not received from the refrigerator 201, this lack of signal may be detected as an anomaly.

In one embodiment the anomaly may comprise receiving at least one spurious signal from one of the sensors when a signal is not expected based upon the previously stored data associated with the known activity. For example, if the activity that has been identified at 102 is drinking water, the system may expect signals from the refrigerator 201, sink 202, and cabinet door 203. However, if a signal is also received from the garbage receptacle door 206, this may be detected as an anomaly.

In one embodiment, the anomaly detected may be recorded within a data storage location at 105. The data storage location may be a simple database or may be a more complicated data storage location. However, the data should be stored in a format that is able to be processed by the system. The data storage location may store data associated with anomalies. For example, each anomaly that is detected may be stored in the storage location for processing by the system. As an example, in one embodiment, for any anomaly detected as being associated with a particular sensor, the system may increase a counter that keeps track of how many anomalies have been detected as associated with a particular sensor. Other methods for keeping track of the anomalies are possible and contemplated; the counter is just a simple example for explanation.

An embodiment may take no further action based upon the anomaly detected and/or recorded. This is to allow for some unknown conditions within the system. One such unknown is that the system may have misclassified/misidentified the activity at 102, which could result in unexpected results. For example, the system may identify an activity as drinking water based upon receiving signal events from the refrigerator 201, sink 202, and cabinet door 203, within the pattern previously stored for the drinking water activity. The system additionally receives a signal from the garbage receptacle door 206, which the system has identified as an anomaly. However, the user activity the user is actually engaging in is putting away groceries, which has the same or similar signal events and patterns to the drinking water activity. Due to the fact that the system mischaracterized the activity, the garbage receptacle door 206 has been identified as an anomaly but actually is not an anomaly based upon the actual activity the user performed. In order to help prevent such misclassifications, the system works for activities which can be detected with a predetermined accuracy. Therefore, the system's activity detection logic is robust against misclassifications.

Another unknown condition is if the user behavior has changed. As an example, the system has previously learned the signal events and patterns associated with drinking water. However, the user now no longer uses the sink 202 or cabinet door 203 to drink water, rather the user is now using bottles of water and only opens the refrigerator 201 to perform this activity. The system may then identify the missing signals for the sink 202 and cabinet door 203 as anomalies, even when they may be functioning properly. In order to help with such activity changes, the system periodically checks or relearns, if necessary, the sensor events and rules/patterns associated with a particular activity. Additionally, the user may provide feedback that a detected anomaly is false which may cause the system to relearn the sensor events and rules/patterns associated with the activity.

An embodiment may take further action based upon the anomaly detected if conditions indicate that further action should be taken. For example, one embodiment may identify that the sensor(s) associated with the anomaly detected has failed. The system may have a method for identifying sensors which are miscommunicating, for example, the sensor is no longer communicating with the system. However, the system as described herein may also identify failed sensors which may still be communicating with the central system, but the sensor is not performing as expected. For example, the sensor may have been bumped or moved and is no longer detecting events and/or activities. In one embodiment, the identification of a failed sensor may comprise the counter, as given as an example above, reaching or exceeding a predetermined threshold.

In one embodiment, the identification of a failed sensor may comprise calculating an improbability of either not firing or misfiring associated with a particular sensor. This improbability calculation may indicate a likelihood of sensor failure. The improbability calculation does not necessarily indicate an improbability of sensor failure, but may rather indicate a probability of sensor failure. In other words, just because it is called an improbability calculation does not mean that it only calculates improbability.

As each anomaly is detected, an embodiment may calculate the improbability of the anomaly being an indication that the sensor has failed. For example, if an anomaly is detected with the refrigerator 201, the system may calculate how likely it is that the user drank water without opening the refrigerator. Each time the system identifies the activity as a known activity and an anomaly is detected, the calculation is modified. For example, if the system has detected that the refrigerator 201 has not been detected with two activities associated with drinking water, the probability becomes based upon two anomalies rather than just one, thereby increasing or decreasing the result of the calculation, depending on the calculation used. In other words, the improbability is calculated for the sensor not actuating during expected activities since its last actuation. In one embodiment, once the calculation result reaches or exceeds a particular threshold, the sensor is identified as failed. Reaching or exceeding a threshold may actually be the result falling below a particular number. Depending on the calculation used, the result may increase or decrease. On the other hand, if a signal is received from the sensor, the counter or probability failure may be reset to 0.

As an example, assuming that the user completes activities using the refrigerator 201, but the sensor for the refrigerator 201 does not send a signal. The activity sequence for the refrigerator 201 may be Sequence="Drink, Cook, Drink, Drink". As shown in FIG. 2, the refrigerator is common between the two activities, but the probability that each activity does or does not use the refrigerator 201 may be different. As an example, the improbability for a user not using the refrigerator 201 while drinking water may be 0.1, and the improbability for the user not using the refrigerator 201 while cooking may be 0.2. The higher number may indicate that the user not using the selected device during the activity is less likely than a lower number. As discussed, this is just an example and the calculation may be completed using a probability number which would reverse the indication of the numbers. The improbability calculation for the activity sequence for the refrigerator 201 may be:

$P(!Refrigerator|Sequence)=0.1*0.2*0.1*0.1=0.0002.$
If $P(!Refrigerator|Sequence)<Threshold$, then the sensor may be indicated as failed.

The improbability/probability calculation threshold may be different for different sensors. For example, the probability associated with a kitchen door not opening but a person being in the kitchen is much lower than a person not activating a sink when expected. Therefore, the calculation can be different between sensors and may also change based upon other factors. For example, if a person adds a door going to the outside in the kitchen, a person could now be in the kitchen without opening the inside kitchen door.

In one embodiment, in identifying a sensor as failed, the system may receive additional data associated with a second known activity from a second plurality of sensors. The additional data received may not be received at the same time as the original data. Rather, the additional data are likely received at a time after the first activity has been associated and an anomaly associated with that data has been recorded. At least one sensor may be common between the sensors which detected the first activity and the sensors which detected the second activity. For example, referring to FIG. 2, the refrigerator 201 is common between the activities of drinking water and cooking. If the system has detected an anomaly regarding the refrigerator 201 when the user performs the activity of drinking water, the system may record this anomaly. Then if the system detects an anomaly with the refrigerator 201 when the user is cooking, this anomaly gets "added" to the anomaly detected in the drinking water activity. As discussed above, with regard to the improbability calculation, each activity may carry a different weight with regard to identifying a failed sensor.

In other words, using the correlation of activities, the system does not focus on predicting failure of a sensor based solely on the history of the single sensor. Rather, the system correlates data received from multiple activities to identify the failed sensor. One situation where this type of correlation becomes useful is when a user has changed their behavior as associated with a particular activity. Using the example discussed above, if the user no longer uses the sink 202 and the cabinet door 203 to drink water, the correlation of other activities that do use the sink 202 and the cabinet door 203 will assist in identifying that the sensors have not failed. Other methods of identifying a failed sensor are possible and contemplated.

Figure 3:
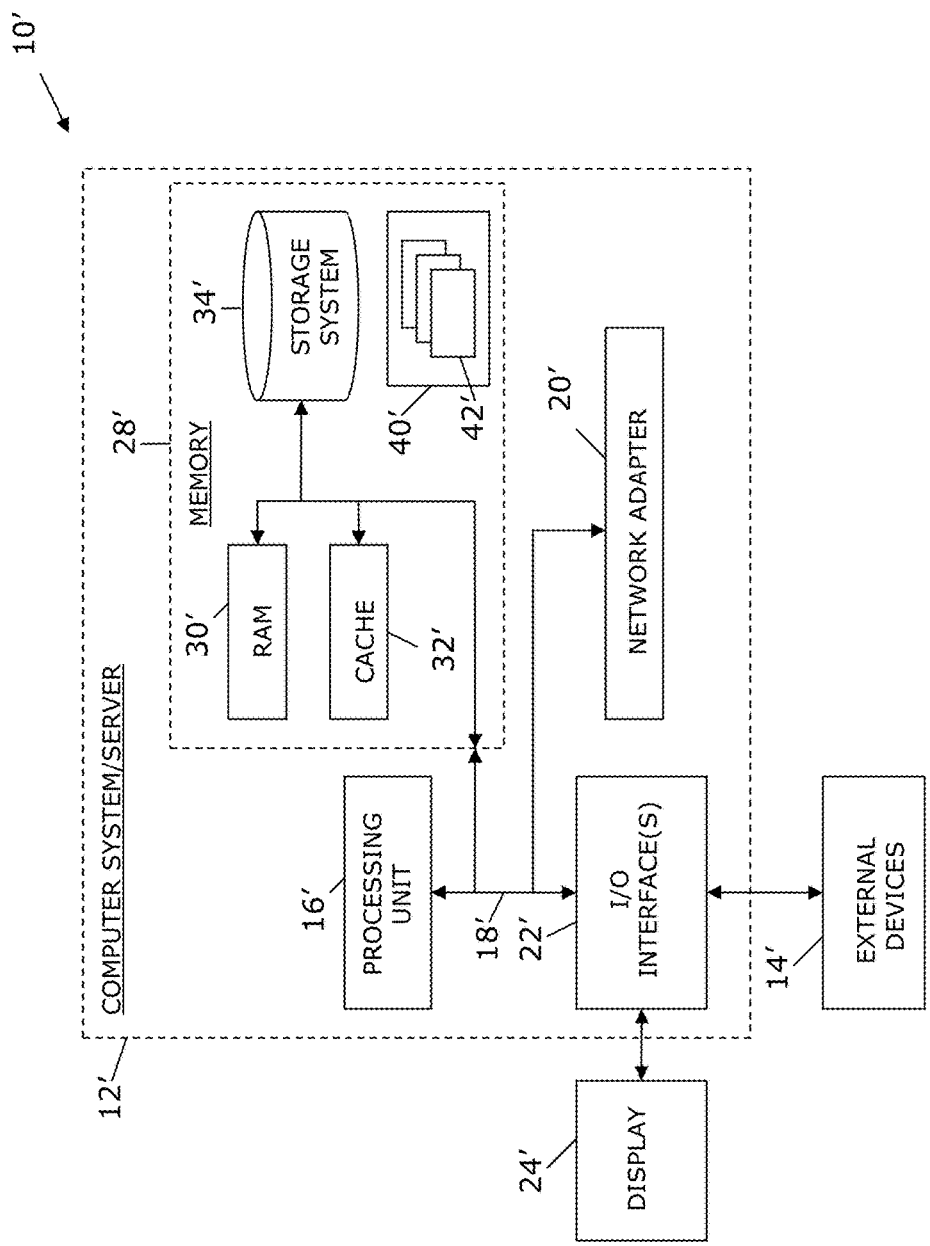
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for identifying failed sensors in a system of interconnected devices, said apparatus comprising:
   at least one processor; and
   a computer readable storage medium having computer readable program code embodied therewith and executable by the at least one processor, the computer readable program code comprising:
   computer readable program code that receives data from a first plurality of sensors, each sensor being operatively coupled to a device within a system of interconnected devices within a living environment, wherein the system of interconnected devices comprise at least a stove, a refrigerator, a sink, and a light;
   computer readable program code that associates the data received with an activity of a user, wherein the activity comprises a living activity;
   computer readable program code that compares the data received with previously stored data associated with the activity of the user, wherein the previously stored data associated with the activity of the user comprises identification of a plurality of sensors that are triggered during performance of the activity and wherein the comparing comprises comparing the first plurality of sensors triggered during receipt of the activity of the user with a plurality of sensors identified as being triggered during a previous receipt of the activity of the user;
   computer readable program code that detects, based on the comparing, an anomaly associated with at least one of the first plurality of sensors corresponding to the activity, wherein the anomaly is based upon the data received from the at least one of the first plurality of sensors being different from the previously stored data;

computer readable program code that records, at a data storage location, the anomaly, wherein the data storage location stores data associated with previously identified anomalies;

computer readable program code that identifies a possible failed sensor using the recorded anomaly, wherein identifying a possible failed sensor comprises determining that more than one recorded anomaly has been associated with the at least one of the first plurality of sensors; and computer readable program code that performs an action in response to the identified possible failed sensor, wherein the action comprises storing information related to the possible failed sensor and aggregating anomalies associate with the possible failed sensor to identify a failed sensor and notify a user of the failed sensor.

2. A computer program product for identifying failed sensors in a system of interconnected devices, comprising:

a computer readable storage medium having computer readable program code embodied therewith, the computer readable program code comprising:

computer readable program code that receives data from a first plurality of sensors, each sensor being operatively coupled to a device within a system of interconnected devices within a living environment, wherein the system of interconnected devices comprise at least a stove, a refrigerator, a sink, and a light;

computer readable program code that associates the data received with an activity of a user, wherein the activity comprises a living activity;

computer readable program code that compares the data received with previously stored data associated with the activity of the user, wherein the previously stored data associated with the activity of the user comprises identification of a plurality of sensors that are triggered during performance of the activity and wherein the comparing comprises comparing the first plurality of sensors triggered during receipt of the activity of the user with a plurality of sensors identified as being triggered during a previous receipt of the activity of the user;

computer readable program code that detects, based on the comparing, an anomaly associated with at least one of the first plurality of sensors corresponding to the activity, wherein the anomaly is based upon the data received from the at least one of the first plurality of sensors being different from the previously stored data;

computer readable program code that records, at a data storage location, the anomaly, wherein the data storage location stores data associated with previously identified anomalies;

computer readable program code that identifies a possible failed sensor using the recorded anomaly, wherein identifying a possible failed sensor comprises determining that more than one recorded anomaly has been associated with the at least one of the first plurality of sensors; and computer readable program code that performs an action in response to the identified possible failed sensor, wherein the action comprises storing information related to the possible failed sensor and aggregating anomalies associate with the possible failed sensor to identify a failed sensor and notify a user of the failed sensor.

3. The computer program product of claim 2, wherein the possible failed sensor is identified as the at least one of the first plurality of sensors for which the anomaly was detected.

4. The computer program product of claim 2, wherein the computer readable program code that identifies a possible failed sensor comprises calculating an improbability associated with the at least one of the first plurality of sensors, wherein the improbability identifies a likelihood of sensor failure.

5. The computer program product of claim 2, wherein the computer readable program code that identifies a possible failed sensor comprises:

calculating an improbability associated with the at least one of the first plurality of sensors; and determining that the improbability exceeds a predetermined threshold.

6. The computer program product of claim 2, wherein the computer readable program code that records comprises increasing a counter associated with the at least one of the first plurality of sensors for which an anomaly is detected.

7. The computer program product of claim 6, wherein the computer readable program code that identifies comprises identifying that the counter associated with the at least one of the first plurality of sensors exceeds a predetermined threshold.

8. The computer program product of claim 2, wherein the computer readable program code further:

receives additional data, associated with a second activity, from a second plurality of sensors, wherein at least one sensor is common between the first plurality of sensors and the second plurality of sensors; and wherein the computer readable program code that identifies a possible failed sensor comprises identifying that the anomaly is associated with the at least one common sensor.

9. The computer program product of claim 2, wherein the anomaly comprises receiving no signal from the at least one of the first plurality of sensors when a signal is expected based upon the previously stored data associated with the activity.

10. The computer program product of claim 2, wherein the anomaly comprises receiving at least one spurious signal from the at least one of the first plurality of sensors when a signal is not expected based upon the previously stored data associated with the activity.

* * * * *